United States Patent
Busch et al.

(10) Patent No.: US 7,300,696 B2
(45) Date of Patent: Nov. 27, 2007

(54) TRANSPARENT POLYOLEFIN FILM HAVING A UV BARRIER

(75) Inventors: Detlef Busch, Saarlouis (DE); Bertram Schmitz, Sarreguemines (FR); Karl-Heinz Kochem, Neunkirchen (DE); Petra Häde, Saarbrücken (DE)

(73) Assignee: Treofan Germany GmbH & Co. KG (DE)

( * ) Notice: Subject to any disclaimer, the term of this patent is extended or adjusted under 35 U.S.C. 154(b) by 336 days.

(21) Appl. No.: 10/513,936

(22) PCT Filed: May 21, 2003

(86) PCT No.: PCT/EP03/05302

§ 371 (c)(1),
(2), (4) Date: Nov. 9, 2004

(87) PCT Pub. No.: WO03/099911

PCT Pub. Date: Dec. 4, 2003

(65) Prior Publication Data

US 2005/0202236 A1 Sep. 15, 2005

(30) Foreign Application Priority Data

May 23, 2002 (DE) ................ 102 22 965

(51) Int. Cl.
*B32B 7/02* (2006.01)
(52) U.S. Cl. .............. 428/212; 428/106; 428/130; 428/328; 428/516
(58) Field of Classification Search .......... None
See application file for complete search history.

(56) References Cited

U.S. PATENT DOCUMENTS

| | | | | |
|---|---|---|---|---|
| 4,698,261 | A | * 10/1987 | Bothe et al. | 428/204 |
| 4,927,464 | A | 5/1990 | Cowie | |
| 5,326,625 | A | * 7/1994 | Schuhmann et al. | 428/215 |
| 5,391,609 | A | 2/1995 | Knoerzer et al. | |
| 5,449,552 | A | * 9/1995 | Bochow et al. | 428/323 |
| 5,817,412 | A | * 10/1998 | Lohmann et al. | 428/336 |
| 2003/0157352 | A1 | * 8/2003 | Murschall et al. | 428/483 |

* cited by examiner

*Primary Examiner*—Milton I. Cano
*Assistant Examiner*—David J. Joy
(74) *Attorney, Agent, or Firm*—Connelly Bove Lodge & Hutz LLP

(57) ABSTRACT

The invention relates to a biaxially oriented transparent polypropylene film having a good UV barrier. The film contains, in at least one layer, nanoscalar titanium dioxide. The total content of nanoscalar titanium dioxide in the film ranges from 0.5 to 1.5% by weight with regard to the total weight of the film.

17 Claims, No Drawings

TRANSPARENT POLYOLEFIN FILM HAVING A UV BARRIER

RELATED APPLICATIONS

This application is a national stage application (under 35 U.S.C. 371) of PCT/EP03/05302 filed May 21, 2003 which claims benefit to German application serial no. 102 22 965.1 filed May 23, 2002.

The present invention relates to a biaxially stretched polyolefin film having a good UV barrier action which simultaneously has high transparency and high gloss values.

The prior art discloses polyolefin films which are biaxially oriented for certain applications and generally have a thickness in the range from 3 to 100 μm. Biaxially oriented films of this type are modified by means of suitable additives in order, for example, to improve the friction, antistatic properties, thermal stability or other film properties. However, these additives must not adversely affect other important service properties, such as, for example, gloss and haze. These films are employed in a very wide variety of areas. Packaging of foods of all types plays an important role. Perishable, in particular fat-containing foods are generally packaged using opaque or metallized films. The opacity or metallization ensures that the packaged food is not adversely affected by UV radiation. As is known, UV radiation promotes oxidation of unsaturated fatty acids and thus rapidly results in impairment of the food quality or even a rancid aroma of the food in question.

In other applications too, the adverse effect of UV radiation is undesired, for example the bleaching of coloured articles exposed to intense sunlight. This occurs, for example, in the case of textiles or other displays in shop windows or in exhibition halls containing valuable works of art, such as pictures, carpets, etc.

Effective protection against UV radiation in food packaging has hitherto only been possible by metallizing or colouring the films and thus filtering out the entire spectrum of light. It is of course then no longer possible to see the packaged product. Furthermore, opaque films no longer have the desired high gloss which is required for attractive packaging which is effective for advertising purposes. Metallized films require an additional processing step, metallization, which additionally makes the packaging more expensive. There is therefore a need for biaxially stretched polypropylene films which have a good UV barrier action and are still transparent.

In order to solve this problem, various UV absorbers, such as, for example, benzophenone, have been developed in the past, but, although they do result in a transparent film, they do not absorb UV radiation to an adequate extent at the usual low film thickness for BOPP films (i.e. less than 100 μm). For effective UV absorption, the concentration must be so high that overloading of the polymer matrix occurs. This in turn means that the additive migrates out of the film and can thus no longer be used for the area of food packaging.

The prior art discloses modifications of polymeric materials with nanoscale additives. Materials of this type comprise a nanoscale additive which improves certain service properties of these polymers.

U.S. Pat. No. 5,391,609 describes transparent films which have a UV barrier action through the addition of nanoscale titanium dioxide. It is described that the nanoscale titanium dioxide particles should have a mean particle diameter of from 0.01 to 0.05 μm. According to the examples, the UV transmission is reduced to below 10% through the addition of these nanoparticles. These films are afflicted with the disadvantage that the nanoscale titanium dioxide particles agglomerate to form larger particles on incorporation into the films and are no longer present in the form of nanoscale particles in the film. This adversely affects, in particular, the haze of the film. In some cases, the optical properties are also impaired by fisheyes or similar optical non-uniformities.

The object of the present invention was to provide a biaxially oriented polyolefin film which is distinguished firstly by a good UV barrier action and at the same time should have high transparency and high gloss. The other important service properties of biaxially oriented packaging films, such as mechanical strength, heat-sealability, water vapour barrier action, etc., must not be impaired in the process.

This object is achieved by a transparent, biaxially oriented polyolefin film which comprises nanoscale titanium dioxide in at least one layer, where the total content of nanoscale titanium dioxide in the film is in a range from 0.5 to 1.5% by weight, based on the total weight of the film, and the titanium dioxide particles have a coating.

The biaxially oriented films according to the invention have an effective UV barrier action at the same time as high transparency and good gloss. For the purposes of the present invention, a UV barrier action is present if the film has a transmission of less than 30%, preferably less than 20%, in a wavelength range from 200 to 320 nm. Surprisingly, the films simultaneously exhibit surprisingly high transparency. In general, the haze is in a range from 1 to 8, preferably from 2 to 6, in particular from 2 to 5.

Furthermore, the films exhibit uniform optical properties without flaws, such as spots or inclusions, and meet the high requirements made of the optical properties of transparent packaging films.

For the purposes of the present invention, UV radiation is taken to mean radiation having a wavelength in the range from 200 to 320 nm. For the purposes of the present invention, UV barrier films are films in which the transmission of UV radiation is less than 30%, preferably in a range from 3 to 25%, in particular from 5 to 20%.

It is essential to the invention that the transparent film comprises a coated nanoscale titanium dioxide in an amount of from 0.3 to 1.8% by weight, preferably from 0.5 to 1.5% by weight, in particular from 0.6 to 1.2% by weight, based on the total weight of the film. For the purposes of the present invention, nanoscale means a mean particle size of less than 30 nm, preferably from 10 to 25 nm, in particular from 15 to 20 nm. It has been found that, with less than 0.4% by weight of $TiO_2$ in the film, the UV absorption is only increased insignificantly compared with an unmodified film, i.e. the transmission for light in the wavelength region <320 nm is still above about 40%. It has furthermore been found that an increase in the $TiO_2$ content in the film to greater than 1.2% by weight only increases the UV absorption to an insignificant extent, but at the same time increases the haze disproportionately in spite of the coating. Surprisingly, the films having a $TiO_2$ content in the range from only 0.5 to 1.5% by weight already exhibit an excellent UV barrier action, i.e. the transmission values are below 30%. Surprisingly, the haze of the biaxially oriented film is only impaired to an insignificant extent by the nanoscale $TiO_2$. It has been found that the haze values are at most quadrupled by the addition of from 0.5 to 1.2% by weight of $TiO_2$, compared with films having an identical structure and composition, but without $TiO_2$. This is particularly surprising in view of the fact that $TiO_2$ is normally a common additive to OPP films which is employed to colour films white or, in the case of vacuole-containing films, in order to increase the whiteness. $TiO_2$ particles of this type generally have a mean particle size of from 100 to 200 nm and result, in extremely small amount, in complete collapse of the haze values. Although white coloration of the film was not to be expected owing to the particle size of the nanoscale TiO$_2$, a considerable impairment of gloss and haze was expected.

It is known that incompatible additives in thin, biaxially oriented films create a large number of interfaces at which light penetrating in is diffracted or scattered, resulting in considerable impairment of gloss and haze. It has been found that it is essential, in order to maintain high transparency, that the nanoscale titanium dioxide must be present in an extremely fine distribution of this type even after incorporation into the biaxially stretched film. This means that the TiO$_2$ must not agglomerate to form relatively large particle sizes during processing in the film production process. Agglomerations of this type are known of conventional TiO$_2$ and other incompatible additives. It was expected that the agglomerations occur to an increased extent, especially in the particularly fine nanoscale TiO$_2$, and thus it is not possible to avoid considerable hazing of the film and optical non-uniformities. An effect of this type was also observed on repeating the prior art (U.S. Pat. No. 5,391,609) (it was found that this is, surprisingly, not the case).

In accordance with the invention, the nanoscale TiO$_2$ is therefore provided with a coating which additionally contributes to preventing undesired agglomerations. Suitable coatings are, for example, of organic compounds, such as fatty acids, for example stearic acids, stearates or the like, which improve the compatibility with the polymer matrix and support the incorporation and dispersal of the pigment in the polymer matrix. Organic coatings of this type can be combined, if desired, with an inorganic component. For the present invention, nano-titanium dioxide with an Al$_2$O$_3$ coating and the additional organic coating, preferably comprising stearic acid, is particularly suitable. Processes for the coating of particles are known per se from the prior art and have already been described extensively in connection with the coating of conventional titanium dioxides.

Nanoscale materials can be produced using various processes. In principle, nanostructures are obtained either by deliberate assembly of individual atoms or correspondingly by comminution of existing microscale structures. However, the former has by far the greater importance here. The two production processes principally used are wet-chemical processes, including hydrothermal, precipitation, spray-drying and sol-gel processes, or spray reaction processes, which also include gas-phase synthesis.

In a preferred embodiment of the invention, the nanoscale TiO$_2$ is incorporated into the film via a concentrate. To this end, coated nanoscale TiO$_2$ is firstly incorporated in a relatively large amount into a polymer matrix, and this so-called masterbatch is then used for the production of the film. Matrix polymers for concentrates or masterbatches of this type can be polyethylenes or polypropylenes, which should generally be compatible with the base polymer of the film. The concentration of TiO$_2$ in the concentrates or masterbatches is generally in a range from 2 to 30% by weight, preferably from 5 to 25% by weight, in particular from 10 to 25% by weight, based on the concentrate.

The film according to the invention can be single-layered or multilayered. Multilayered embodiments are built up from a base layer and at least one top layer, preferably top layers on both sides. If desired, additional interlayers may be applied on one or both sides between the base layer and the top layer. The base layer is the layer which has the greatest layer thickness and makes up at least 40%, preferably from 50 to <100%, of the total thickness of the film. Top layers are outer layers. Interlayers are naturally internal layers which lie between the base layer and the top layer. The film according to the invention can thus have one, two, three, four or five layer(s). If desired, these basic structures can be provided with further layers, for example by coating or lamination.

In accordance with the invention, the total content of nanoscale TiO$_2$ in the film is important for the good UV barrier action of the present invention. In general, it is preferred to incorporate the corresponding amount of TiO$_2$ into the base layer and/or the interlayer(s). For embodiments of this type, the TiO$_2$ content in the base layer is from 0.8 to 3% by weight, preferably from 1.2 to 2.2% by weight, based on the weight of the base layer. For embodiments comprising TiO$_2$ in the interlayer(s), the content is from 2 to 5% by weight, preferably from 2.5 to 4% by weight, based on the weight of the interlayer. It has been found that embodiments which comprise nanoscale coated titanium dioxide in the stated amount only in the interlayer are particularly advantageous with respect to gloss, haze and uniform optical properties. This result is surprising since, in this embodiment, the concentration, based on the layer, is particularly high and increased agglomeration and impaired optical properties were to be expected.

The thickness of the film is in a range from 5 to 80 μm, preferably from 10 to 60 μm, in particular from 10 to 30 μm. The thickness of the interlayers is generally from 1 to 10 μm, preferably from 3 to 8 μm, and the thickness of the top layers is from 0.5 to 5 μm, preferably from 1 to 3 μm, with the base layer making up the rest.

The base layer of the transparent film according to the invention generally comprises at least 85% by weight, preferably from 90 to <100% by weight, in particular from 98 to <100% by weight, in each case based on the layer, of a polyolefin. Polyolefins are, for example, polyethylenes, polypropylenes, polybutylenes or copolymers of olefins having from two to eight carbon atoms, amongst which polyethylenes and polypropylenes are preferred.

In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene and butylene. The data in % by weight are in each case based on the propylene polymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably 2-5% by weight, based on the starting polymer. The molecular weight distribution of the propylene polymer can vary.

The ratio of weight average $M_w$ to number average $M_n$ is generally between 1 and 15, preferably from 2 to 10, very particularly preferably from 2 to 6. Such a narrow molecular weight distribution of the propylene homopolymer is achieved, for example, by peroxidic degradation thereof or by preparation of the polypropylene by means of suitable metallocene catalysts.

In a further embodiment of the invention, the polypropylene employed in the base layer is highly isotactic. For highly isotactic polypropylenes of this type, the chain isotacticity index of the n-heptane-insoluble content of the polypropylene, determined by means of $^{13}$C-NMR spectroscopy, is at least 95%, preferably from 96 to 99%.

In addition, the base layer of the film may comprise conventional additives, such as neutralizers, stabilizers, antistatics and/or lubricants, in effective amounts in each case. The base layer preferably comprises a combination of lubricants, such as, for example, fatty acid amide, and antistatics, such as, for example, tertiary aliphatic amines, as well as neutralizers and stabilizers.

Preferred antistatics are alkali metal alkanesulphonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having from 10 to 20 carbon atoms which are substituted by alpha-hydroxy-($C_1$-$C_4$)alkyl groups, where N,N-bis(2-hydroxyethyl)alkylamines having from 10 to 20 carbon atoms, preferably from 12 to 18 carbon atoms, in the alkyl radical are particularly suitable. The effective amount of antistatic is in the range from 0.05 to 0.5% by weight.

Lubricants are higher aliphatic acid amides, higher aliphatic acid esters, waxes and metal soaps, as well as polydimethylsiloxanes. The effective amount of lubricant is in the range from 0.01 to 3% by weight, preferably from 0.02 to 1% by weight. Particularly suitable is the addition of higher aliphatic acid amides to the layer in the range from 0.01 to 0.25% by weight. A particularly suitable aliphatic acid amide is erucamide. The addition of polydimethylsiloxanes is preferred in the range from 0.02 to 2.0% by weight, in particular polydimethylsiloxanes having a viscosity of from 5000 to 1,000,000 $mm^2$/s.

Stabilizers which can be employed are the conventional compounds which have a stabilizing action for polymers of ethylene, propylene and other olefins. Their added amount is between 0.05 and 2% by weight. Particularly suitable are phenolic stabilizers, alkali or alkaline earth metal stearates and/or alkali or alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis-3-(3,5-di-tertiary-butyl-4-hydroxyphenyl)-propionate and 1,3,5-trimethyl-2,4,6-tris(3,5-di-tertiary-butyl-4-hydroxybenzyl)benzene are particularly advantageous.

Neutralizers are preferably dihydrotalcite, calcium stearate and/or calcium carbonate having a mean particle size of at most 0.7 µm, an absolute particle size of less than 10 µm and a specific surface area of at least 40 $m^2$/g. Neutralizers are usually employed in an amount of from 0.01 to 0.1% by weight.

The above data in % by weight are in each case based on the weight of the base layer.

The top layer(s) and the interlayers generally comprise(s) from 95 to 100% by weight of a polyolefin, preferably from 98 to <100% by weight of polyolefin, in each case based on the weight of the top layer(s). Polyolefins for the top layers and the interlayers are, for example, homopolymers of polyethylene or polypropylene and copolymers with ethylene, propylene or butylene as comonomer.

Examples of preferred olefinic polymers of the top layer (s) and the interlayers are propylene homopolymers, copolymers or terpolymers comprising ethylene-propylene and/or butylene units or mixtures of the said polymers. Of these, preferred polymers are propylene homopolymer, as described above for the base layer, or random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-i-butylene terpolymers and propylene-1-butylene copolymers having an ethylene content of from 0.1 to 7% by weight and a propylene content of from 50 to 90% by weight and a 1-butylene content of from 10 to 40% by weight.

For the interlayers, the propylene homopolymers described above are particularly suitable. For heat-sealable embodiments of the film, preference is given to the use of top layers comprising propylene copolymer or propylene terpolymer.

The data in % by weight are in each case based on the weight of the polymer. The above-described copolymers and/or terpolymers employed in the top layer(s) generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the melt flow indices indicated above are measured at 230° C. and a force of 21.6 N (DIN 53 735). If desired, all the top-layer polymers described above may have been peroxidically degraded, with the degradation factor generally being in a range from 1 to 15, preferably from 1 to 8.

If desired, the additives described above for the base layer, such as antistatics, neutralizers, lubricants and/or stabilizers, can be added to the top layer(s) and the interlayer(s), and, if desired, additionally antiblocking agents can be added to the top layers. The data in % by weight are then based correspondingly on the weight of the top layer.

Suitable antiblocking agents for the top layer are inorganic additives, such as silicon dioxide, calcium carbonate, magnesium silicate, aluminium silicate, calcium phosphate and the like and/or incompatible organic polymers, such as polyamides, polyesters, polycarbonates and the like, amongst which polymethyl methacrylates and silicon dioxide are preferred. The effective amount of antiblocking agent is in the range from 0.1 to 2% by weight, preferably from 0.1 to 0.8% by weight. The mean particle size is between 1 and 6 µm, in particular 2 and 5 µm.

The films according to the invention can be produced by stenter or blowing processes known per se.

In the stenter process, the melts corresponding to the individual layers of the film are coextruded through a flat-film die, the resultant film is taken off over one or more roll(s) for solidification, the film is subsequently stretched (oriented), the stretched film is heat-set and, if desired, plasma- corona- or flame-treated on the surface layer intended for the treatment.

Biaxial stretching (orientation) is carried out sequentially or simultaneously. The sequential stretching is generally carried out consecutively, with consecutive biaxial stretching, in which stretching is firstly carried out longitudinally (in the machine direction) and then transversely (perpendicular to the machine direction), being preferred. The film production is described further using the example of flat-film extrusion with subsequent sequential stretching.

Here, as is usual in the extrusion process, the polymer or polymer mixture of the individual layers is compressed and liquefied in an extruder, it being possible for the nanoscale $TiO_2$ and any other additives added already to be present in the polymer or polymer mixture. The nanoscale titanium dioxide can also be added, as described, via a masterbatch.

The melts are then forced simultaneously through a flat-film die (slot die), and the extruded multilayered film is taken off over one or more take-off rolls at a temperature of from 10 to 100° C., preferably from 20 to 50° C., during which it cools and solidifies.

The film obtained in this way is then stretched longitudinally and transversely to the extrusion direction, which results in alignment of the molecule chains. The longitudinal stretching is preferably carried out at a temperature of from 80 to 150° C., advantageously with the aid of two rolls running at different speeds corresponding to the target stretching ratio, and the transverse stretching is preferably carried out at a temperature of from 120 to 170° C. with the aid of an appropriate tenter frame. The longitudinal stretching ratios are in the range from 4 to 8, preferably from 5 to 6. The transverse stretching ratios are in the range from 5 to 10, preferably from 7 to 9.

The stretching of the film is followed by heat-setting (heat treatment) thereof, in which the film is held at a temperature of from 100 to 160° C. for from about 0.1 to 10 seconds. The film is subsequently wound up in a conventional manner by means of a wind-up device.

After the biaxial stretching, one or both surface(s) of the film is (are) preferably plasma-, corona- or flame-treated by one of the known methods. The treatment intensity is generally in the range from 37 to 50 mN/m, preferably from 39 to 45 mN/m.

The raw materials and films were characterized using the following measurement methods:

Melt Flow Index

The melt flow index was measured in accordance with DIN 53 735 at a load of 21.6 N and 230° C.

Mean Particle Size

The mean particle size of the nanoscale particles in the film was determined by means of scanning electron microscopy.

For this purpose, a sample is dispersed in water in order to separate the particles and applied to a glass slide. The sample is subsequently dried and studied under the scanning electron microscope. For this purpose, the individual particles are visualized as a grey shade image by means of a suitable setting of brightness and contrast. Over an area of 10 mm$^2$, the respective area of the separated particles is measured, and the particle diameter output as the diameter of a circle of equal area. These measurement values are classified by size ranges and indicate the distribution of the particle size. The mean particle diameter is determined as the mean of the distribution curve.

Light Transparency

The light transparency is measured in accordance with ASTM-D 1003-77.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 20°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

UV Absorption

The UV absorption is measured using a UV/VIS/NIR spectrometer (Perkin Elmer Lambda 9 or 19). The instrument has two beam paths (twin-beam spectrometer). The first beam is the reference beam, the other is the sample beam. No reference solvent is located in the reference beam since measurement is made against air. The sample is introduced into the sample beam after calibration of the spectrometer.

The calibration of the spectrometer is carried out by setting the desired measurement range (in your case 200 to 800 nm) when both beam paths are free (i.e. air-against-air calibration) and subsequently recording the 100% line in the selected wavelength range. For the measurement, the sample is inserted into the sample holder, which is located in the sample beam. The measurement is subsequently carried out in the same wavelength range in which the 100% line was also measured. The measurement is thus carried out sample against air. This is followed by processing of the spectrum. This means storing and subsequently plotting the measured spectrum. A choice can be made here between transmission and absorbance as the y-axis.

The invention is now explained in greater detail with reference to examples.

EXAMPLE 1

A transparent, five-layered film having the structure A/Z1/B/Z2/A and a total thickness of 21.5 µm was [lacuna] by coextrusion and subsequent stepwise orientation in the longitudinal and transverse directions. The top layers each had a thickness of 0.7 µm, and the interlayer thicknesses were each 3.8 µm.

| Base layer (B): | |
|---|---|
| About 100% by wt. | of isotactic propylene homopolymer having a melting point of 166° C. and a melt flow index of 3.3 g/10 min |
| Interlayers: | |
| (Z1) about 100% by wt. | of isotactic propylene homopolymer having a melting point of 166° C. and a melt flow index of 3.3 g/10 min |
| (Z2) about 97.5% by wt. | of isotactic propylene homopolymer having a melting point of 166° C. and a melt flow index of 3.3 g/10 min |
| about 2.5% by wt. | of coated nanoscale titanium dioxide via 20% masterbatch, |
| Top layers (A) | |
| About 100% by wt. | of terpolymer (C2C3C4) having a melting point of 126° C. and a melt flow index of 6 g/10 min |

All layers comprised stabilizers and neutralizers in conventional amounts. The production conditions in the individual process steps were:

| Extrusion: | | |
|---|---|---|
| Temperatures | Base layer: | 260° C. |
| | Interlayer A: | 255° C. |
| | Interlayer B: | 250° C. |
| | Top layer A: | 265° C. |
| | Top layer B: | 270° C. |
| | Temperature of the take-off roll: | 20° C. |
| Longitudinal stretching: | Temperature: | 110° C. |
| | Longitudinal stretching ratio: | 4.5 |
| Transverse stretching: | Temperature: | 170° C. |
| | Transverse stretching ratio: | 8 |
| Setting: | Temperature: | 145° C. |
| | Convergence: | 2% |

The biaxially oriented film has a transmission for UV radiation of <40% in the region below 320 nm. The gloss (20°) is 125, while the haze is 4.6.

EXAMPLE 2

A five-layered transparent film was produced as in Example 1. The thickness of interlayer Z2 was increased from 3.7 μm to 6.5 μm here, with the additive concentration of 2.5% by weight, based on the layer, being unchanged. The production conditions in the individual process steps were as in Example 1. The biaxially oriented film produced in this way has a UV transmission of less than 30% in the region <320 nm, while the haze is 6.6 and the gloss (20°) is 125.

EXAMPLE 3

A five-layered transparent film was produced as in Example 1. Only the additive content of 2.5% in interlayer Z2 was increased to 5% here. The production conditions in the individual process steps were as in Example 1. The film has a UV transmission of less than 30% in the region <320 nm and less than 20% in the region <300 nm, while the haze is 7.3 and the gloss (20°) is 123.

EXAMPLE 4

A five-layered transparent film was produced as in Example 3. Here, only the thickness of interlayer A was increased from 3.7 μm to 6.5 μm. The production conditions in the individual process steps were as in Example 1. The film has a UV transmission of less than 10% in the region <320 nm and even <5% in the region <300 nm, while the haze is 15 and the gloss (20°) is 122.

Comparative Example 1

A five-layered transparent film was produced as in Example 1. In contrast to Example 1, no layer comprises nano-titanium dioxide. The production conditions in the individual process steps were as in Example 1. The film exhibits virtually no UV absorption, i.e. the UV transmission is greater than 80% in the region >220 nm. The haze is 1.8 and the gloss (20°) is 135.

Comparative Example 2

A five-layered white film was produced using microscale titanium dioxide as additive in the base. The concentration is 8%, the layer thickness of the base is 22 μm with a total film thickness of 35 μm. The whiteness is 90, the gloss (20°) is 50. The film is not transparent, but instead has a typically white, opaque appearance.

Comparative Example 3

A film was produced as described in Example 3. In contrast to Example 3, an uncoated $TiO_2$ was employed. The remaining composition of the film and the production conditions were unchanged. The film has a UV transmission of less than 30% in the region <320 nm, the haze is about 45 and the gloss (20°) is 90. In addition, the optical properties of this film were impaired by non-uniformities.

The invention claimed is:

1. A transparent, biaxially oriented polyolefin film which comprises nanoscale titanium dioxide in at least one layer, where the total content of nanoscale titanium dioxide in the film is in a range from 0.5 to 1.5% by weight, based on the total weight of the film, characterized in that the titanium dioxide particles have a coating and wherein the film is a multilayer film, comprising a base layer, an interlayer, or intermediate layer, and a cover layer, wherein the interlayer contains the $TiO_2$ in an amount of 2 to 5% by weight and the interlayer layer has a thickness of 1 to 10 μm.

2. The film according to claim 1, wherein the UV transmission of the film in a wavelength range from 200 to 350 nm is less than 30%.

3. The film according to claim 1, wherein the nanoscale $TiO_2$ is provided with an organic coating.

4. The film according to claim 1, wherein the base layer comprises from 0.8 to 3% by weight of $TiO_2$.

5. The film according to claim 1, wherein the thickness of the film is from 10 to 80 μm.

6. The film according to claim 1, wherein the film has on both sides top layers which comprise at least 80% by weight of propylene copolymers and/or propylene terpolymers and have a thickness of from 0.5 to 5 μm.

7. The film according to claim 1, wherein the base layer comprises at least 80% by weight of propylene homopolymer.

8. The film according to claim 1, wherein the interlayer comprises at least 80% by weight of propylene homopolymer.

9. A label containing the film of claim 1.

10. A cigarette packaging containing the film of claim 1.

11. A method of packaging fat-containing foods which comprises incorporating the fat-containing food in a package containing the film as claimed in claim 1.

12. The film according to claim 1, wherein the film has a haze in accordance with ASTM-D 1003-52 of <6.

13. The film according to claim 12, wherein the UV transmission of the film in a wavelength range from 200 to 350 nm is less than 30% and the nanoscale $TiO_2$ is provided with an organic coating.

14. The film according to claim 13, wherein the film is multilayered, and the base layer of the film comprises from 0.8 to 3% by weight of $TiO_2$ and the interlayer of the film comprises from 2 to 5% by weight of $TiO_2$ and the thickness of the film is from 10 to 80 μm.

15. The film according to claim 14, wherein the film has on both sides top layers which comprise at least 80% by weight of propylene copolymers and/or propylene terpolymers and have a thickness of from 0.5 to 5 μm.

16. The film according to claim 15, wherein the base layer comprises at least 80% by weight of propylene homopolymer.

17. The film according to claim 15, wherein the interlayer comprises at least 80% by weight of propylene homopolymer.

* * * * *